United States Patent
Dorr

(10) Patent No.: US 8,482,384 B2
(45) Date of Patent: Jul. 9, 2013

(54) METHOD AND SYSTEM FOR PLAYING SIGNALS AT TWO APPLIANCES

(75) Inventor: Robert C. Dorr, Pueblo, CO (US)

(73) Assignee: ManherCard LLC, Las Vegas, NV (US)

( * ) Notice: Subject to any disclaimer, the term of this patent is extended or adjusted under 35 U.S.C. 154(b) by 244 days.

(21) Appl. No.: 12/898,908

(22) Filed: Oct. 6, 2010

(65) Prior Publication Data

US 2011/0025475 A1 Feb. 3, 2011

Related U.S. Application Data

(63) Continuation of application No. 10/887,196, filed on Jul. 8, 2004, now Pat. No. 7,834,740, which is a continuation of application No. 09/781,047, filed on Feb. 8, 2001, now Pat. No. 6,816,060.

(60) Provisional application No. 60/181,354, filed on Feb. 8, 2000.

(51) Int. Cl.
*G08B 5/22* (2006.01)

(52) U.S. Cl.
USPC .......................................................... 340/7.29

(58) Field of Classification Search
USPC .............. 455/221, 7.29, 7.51, 7.52; 340/7.29, 340/5.61
See application file for complete search history.

(56) References Cited

U.S. PATENT DOCUMENTS

| | | | |
|---|---|---|---|
| 5,444,673 A | 8/1995 | Mathurin | |
| 5,583,965 A * | 12/1996 | Douma et al. | 704/275 |
| 5,832,067 A | 11/1998 | Herold | |
| 6,014,429 A | 1/2000 | LaPorta et al. | |
| 6,088,428 A | 7/2000 | Trandal et al. | |
| 6,236,622 B1 | 5/2001 | Blackman | |
| 6,453,281 B1 | 9/2002 | Walters et al. | |
| 6,634,028 B2 | 10/2003 | Handelman | |
| 6,678,215 B1 | 1/2004 | Treyz et al. | |
| 6,816,060 B2 | 11/2004 | Dorr | |
| 7,336,624 B2 * | 2/2008 | Hattig | 370/255 |

* cited by examiner

*Primary Examiner* — Vernal Brown
(74) *Attorney, Agent, or Firm* — Woodcock Washburn LLP

(57) ABSTRACT

A method for receiving messages in an appliance such as a clock radio modified to retrieve messages from a remote computer, converting the retrieved messages into corresponding audio messages, generating a wake up signal to the user at a selected time in the radio appliance, starting the delivery of the audio messages from a speaker in the radio appliance in response to the generated wake up signal, and receiving audible commands in the radio from the user to control delivery of the messages. In a first embodiment, these method steps are performed in the radio appliance and, in a second embodiment, a remote computer performs all of the messages except delivery of the audio messages and receiving audible commands which occur at the appliance. Where two or more appliances are used, audio commands can cause the delivery of messages to stop in one appliance and resume in another appliance.

26 Claims, 6 Drawing Sheets

METHOD AND SYSTEM FOR PLAYING SIGNALS AT TWO APPLIANCES

CROSS-REFERENCE TO RELATED APPLICATIONS

This application is a continuation of U.S. patent application Ser. No. 10/887,196 filed Jul. 8, 2004, which is a continuation of U.S. patent application Ser. No. 09/781,047 filed Feb. 8, 2001, now U.S. Pat. No. 6,816,060, which claims the benefit of U.S. Provisional Application No. 60/181,354 filed Feb. 8, 2000. Each of which is herein incorporated by reference in its entirety.

TECHNICAL FIELD

The present invention relates to radio appliances and, more particularly, to clock radios

BACKGROUND

The Internet has fostered a host of new technologies including those involving Internet appliances such as a cell phone adapted to interconnect with the Internet.

Traditionally, it is common for a person to have a clock radio that provides sounds to aid in sleep or in which to wake by. An example of such a clock radio is available from Sharper Image Design as a "CD Radio Alarm Clock with Sound Soother." Most household bathrooms also have a radio and/or a shower radio such as that also available from Sharper Image Design sold as "AM/FM Digital Shower Companion."

A need exists to adopt the clock radio, bathroom radio and/or shower radio into an Internet appliance for delivery of timely information to the user in addition to the normal sleep and awake sounds, AM/FM programming, and time.

SUMMARY

A method is provided for receiving messages in an appliance such as a clock radio, bathroom radio, or shower radio modified under the teachings of the present invention to retrieve messages from a remote computer, converting the retrieved messages into corresponding audio messages, generating a wake up signal to the user at a selected time in the radio appliance, starting the delivery of the audio messages from a speaker in the radio appliance in response to the generated wake up signal, and receiving audible commands in the radio from the user to control delivery of the messages. In a first embodiment, these method steps are performed in primarily in components in the radio appliance and, in a second embodiment, a remote computer performs all of the messages except delivery of the audio messages and receiving audible commands which occur at the radio appliance. Where two or more appliances are used, audio commands can cause the delivery of messages to stop in one appliance and resume in another appliance.

DETAILED DESCRIPTION OF ILLUSTRATIVE EMBODIMENTS

1. Overview

Figure 1:
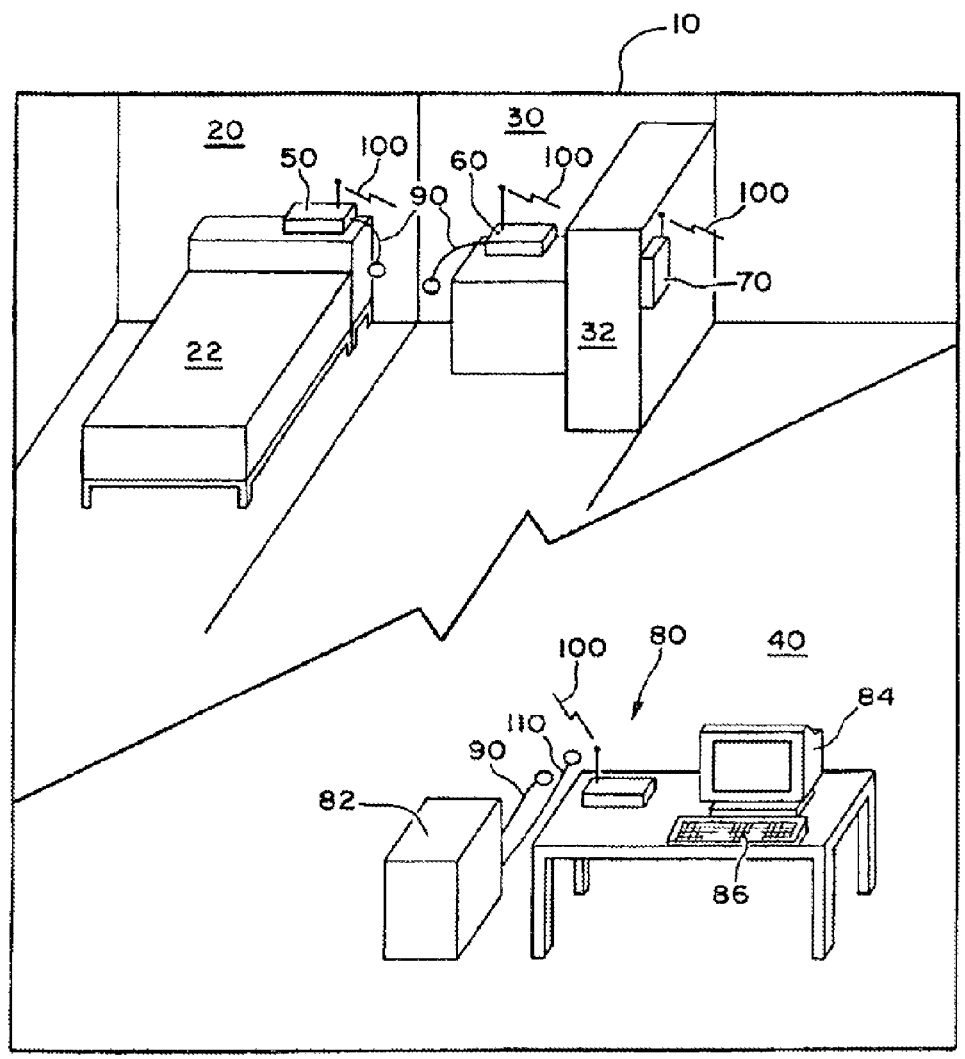
FIG. 1 is an overall block diagram of the system of the present invention.

In FIG. 1, an overview of the present invention is set forth. In a building structure 10 such as a house, a condo, or an apartment, there is typically found a bedroom 20, a bath area 30, and an office area 40. FIG. 1 shows three separate Internet appliances of the present invention 50, 60, and 70. Each of the Internet appliances 50, 60, and 70 communicate with a remote computer system 80 located elsewhere in the building 10 such as, for example, in the home office 40. The communication occurs at least one of three ways: via telephone (or electrical) lines 90 or wireless transmissions 100 or a network link 110. In the preferred embodiment, the computer system 80 is a standard home computer system having a CPU 82, a monitor 84 and a keyboard 86. These components 82, 84, and 86 are conventionally interconnected (not shown).

The appliance 50 of the present invention is a clock radio that operates to provide a wake up alarm to an individual sleeping in bed 22. Appliance 60 is used to provide information to the individual when using the bath area 30. Appliance 70 is used by the individual when taking a shower 32.

It is to be expressly understood that in the preferred embodiment the communication between each appliance 50, 60, and 70 is with computer system(s) 80 or any computing device having communication with the Internet over phone lines 90 or other suitable communication links such as a DSL link, satellite, wireless, etc. Such communication could also be with another computer such as the individual's laptop, a hand-held computer, a cell phone or a remote office computer or network.

2. Appliance Block Diagram

Figure 2:
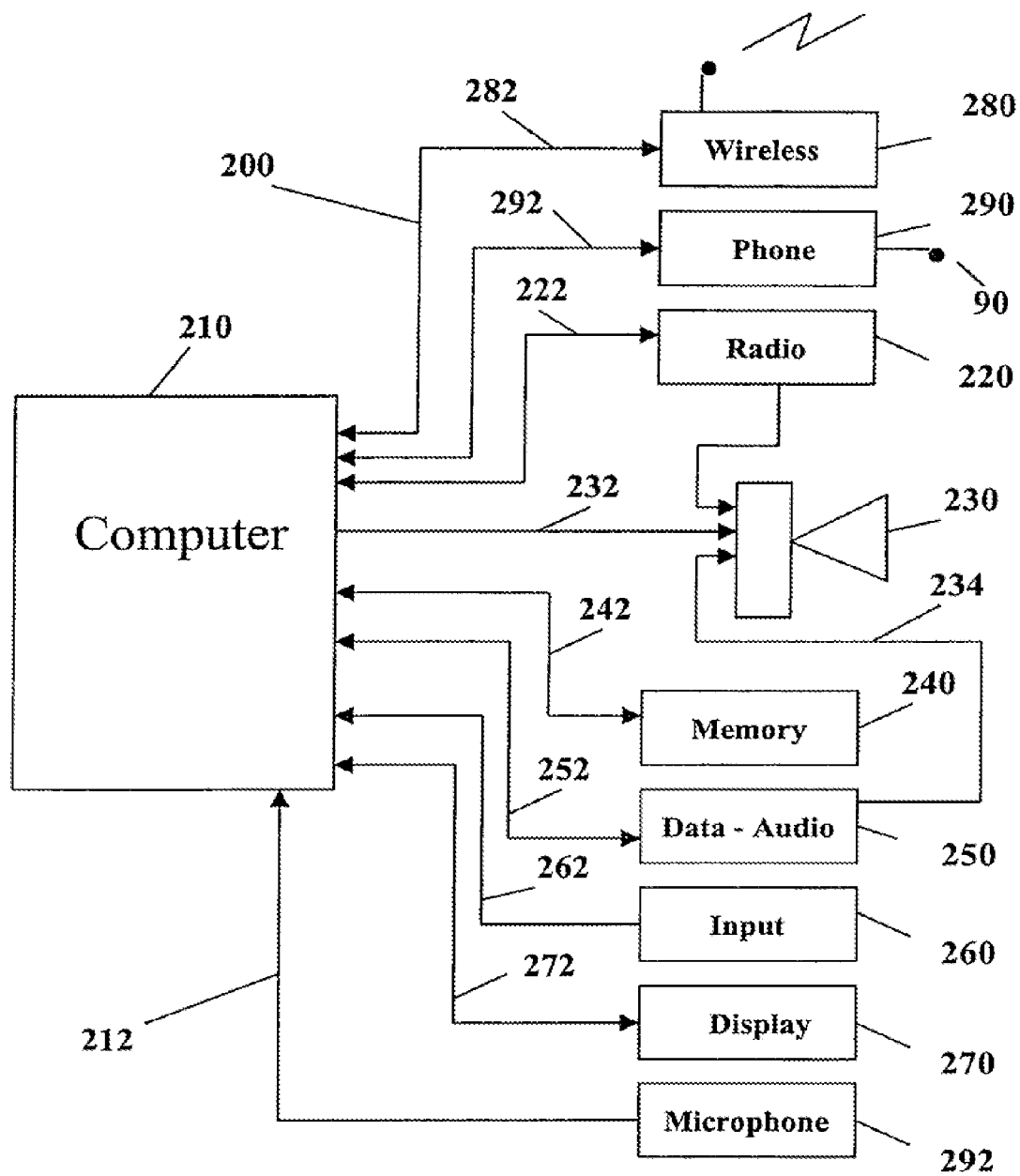
FIG. 2 is a block diagram of an individual appliance of the present invention.

In FIG. 2 is set forth the block diagram components of each of the different appliances 50, 60, and 70. These components are generally referred to as 200. Each appliance 50, 60, and 70 in a first embodiment includes a computer 210, a radio 220, a speaker 230, memory 240, a data-to-audio converter 250, an input 260, and a display 270. Each appliance 50, 60, and 70 may or may not include: a wireless component 280, a phone (electrical) interconnection 290, a network card, etc. Each of the components are discussed next.

In FIG. 2, the wireless communication module 280 can comprise any of a number of conventional approaches including a module 280 based upon, for example, Bluetooth technology. Or, conventional RF technology can be used to communicate data signals from the hub 80 to appliances 50, 60 and 70. The wireless module 280 is connected over a conventional link 282 with computer 210. In an alternate embodiment, rather than using a wireless module 280, a phone communication module 290 can be utilized to convey data signals through the phone outlet 90. Module 290 could also be a conventional transmitter and receiver of coded signals over standard household electrical wiring as found in many burglar alarm sensors. Indeed module 290 can also be any suitable communication device that can be hard-wired 90 to the computer hub 80 such as a network, etc.

The radio 220 and the speaker 230 are conventional and exist in many prior art clock radios. The same is true of display 270 which displays time, radio dial setting, etc.

A memory 240 is provided wherein the computer 210 conventionally stores and retrieves data and the memory 240 includes other types of memory such as memory containing programs, etc. that the computer 210 utilizes.

The data-to-audio converter is any conventionally available module 250 that converts data to the spoken voice. In the preferred embodiment, the computer 210 delivers data over link 252 to the data-to-audio converter 250 to generate sound to speaker 230 such as through connection 234.

Finally, input module 260 is connected to the computer 210 over link 262 to provide input from the user of the appliance 50, 60 or 70. A number of conventionally available software/hardware packages are available for use in computer 210 which performs the function of the data-to-audio module 250.

It is to be expressly understood that a wide variety of conventional components can be utilized under the method herein and that the invention is not limited to the first embodiment shown in FIG. 2.

3. Appliance Operation

Figure 3:
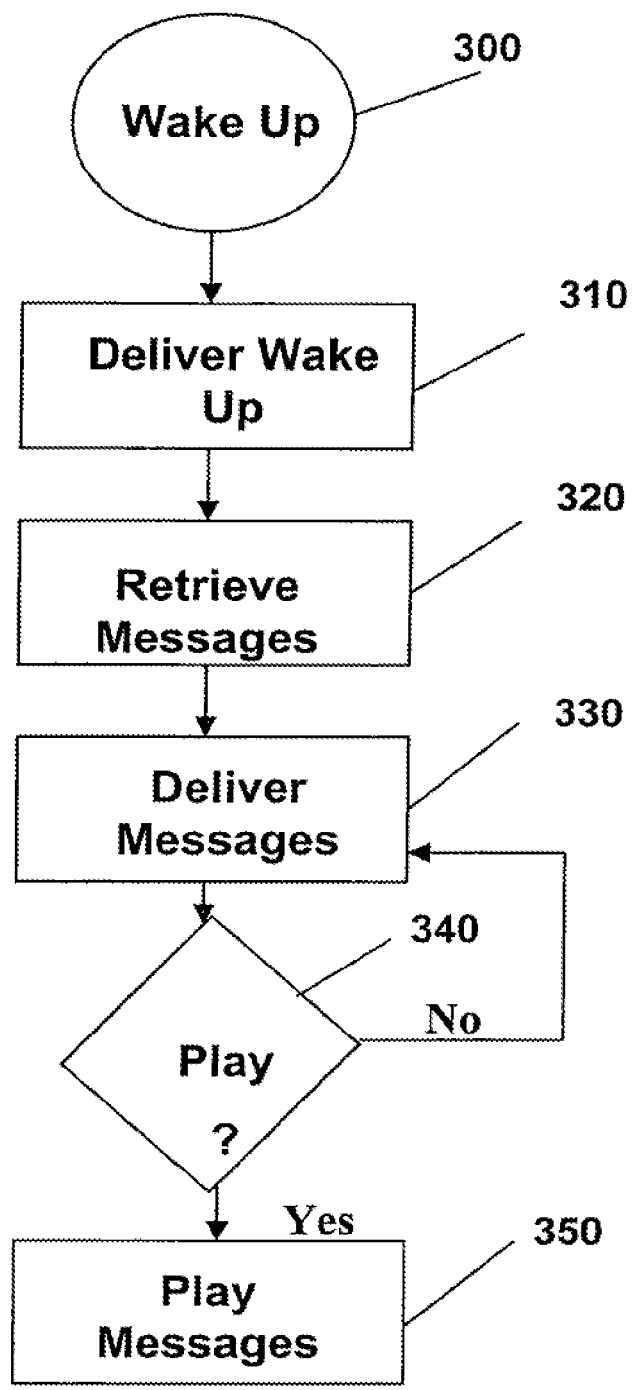
FIG. 3 is a flow chart showing operation in one preferred embodiment.

In operation, a user sleeping in bed 225 is awakened in a conventional fashion by the clock radio features in the appliance 50. The wake-up signaling is delivered by the computer 210 to the wireless module 280 for transmission to the hub 80 as shown in FIG. 3 in step 300. The wake-up signaling can occur prior to the wake-up time, during the wake-up time or just after the wake-up time. The computer hub 80 in step 310 retrieves the desired messages from a message source such as, for example, the Internet in a conventional fashion. These messages can be grouped such as e-mail messages, reports on certain stocks, calendar appointments during the day, call-in messages, etc. The retrieved desired messages can be any suitable message which the user through input 86 at the hub 80 pre-programs the computer:2 to receive upon the issuance of the wake up signal 300. The computer:2 can be programmed to retrieve the messages from a message source at a desired time before wake-up (e.g., two hours before wake-up). The computer 80 can then organize the messages into groups and ready the groups for delivery to the appliance such as in response to the wake-up signal or to an audible command received in the appliance by the user. In a variation, the messages can be retrieved and organized in response to the wake-up signal from the appliance which is also delivered to the remote computer 80. Hence, steps 310 and 320 can be performed in any order. These messages can be automatically delivered back to the computer 210 in the appliance 50 or played back as an audio sound through speaker 230 in which case the data is transformed into a comparable audio signal. Or, an activation from the person in the bed 22 can occur such as pushing a button (not shown) at input 260 or issuing a voice command to microphone 292. Indeed, in some embodiments the microphone 292 is incorporated into the speaker 230. Hence, in stage 330 the messages are delivered to the appliance 50. The messages are played in stage 340 in response to an input signal such as a spoken command to the microphone 292 such as the word "messages." Or the activation of a button or any other suitable input device 260. Or, as mentioned, stage 340 doesn't exist and the delivered messages in stage 330 are automatically played in stage 350. In stage 350, the messages are played, as mentioned, through the data audio module 250 and into the speaker 230. The person lying in bed 22 can listen to e-mail messages, hear appointments scheduled for the day, hear critical stock information, or any other suitable special message.

Indeed, stage 340 can be more sophisticated than described above. For example, a particular grouping of messages can be played in response to a voice command such as "e-mail", "stock", "appointments", etc. Then only a special category of messages are played corresponding to the audible command. Also in stage 340, additional commands such as "stop", "continue", "repeat", "skip," etc. can be utilized to control the delivery of the messages through the speaker 230. As an illustration, an individual e-mail message can be repeated by saying the command "repeat" or the whole group of e-mail messages can be started over by saying the command "repeat e-mail." Or, the user can audibly command the appliance to "sleep" and the appliance 50 by computer 210 resets and lets the user sleep for a period of time before waking again. In which case, the hub computer is signaled to stop delivery of the messages.

It is observed that the present invention by using appliances 50, 60 and/or 70 can provide a wide variety of operating conditions. In one embodiment, only the appliance 50 is used. Or, only the appliance 60 is used. Or, only the appliance 70 is used. In preferred embodiments, at least two of the three appliances are used, preferably appliance 50 and 60. In one embodiment, all three appliances are utilized.

It is to be expressly understood that many variations are possible under the teachings of the present invention other than those set forth above. A wide variety of commands, groups, and messages can be provided and utilized to specifically address a user's unique desires in order to get ready for the upcoming day's events.

4. Appliance Handoff

Figure 4:
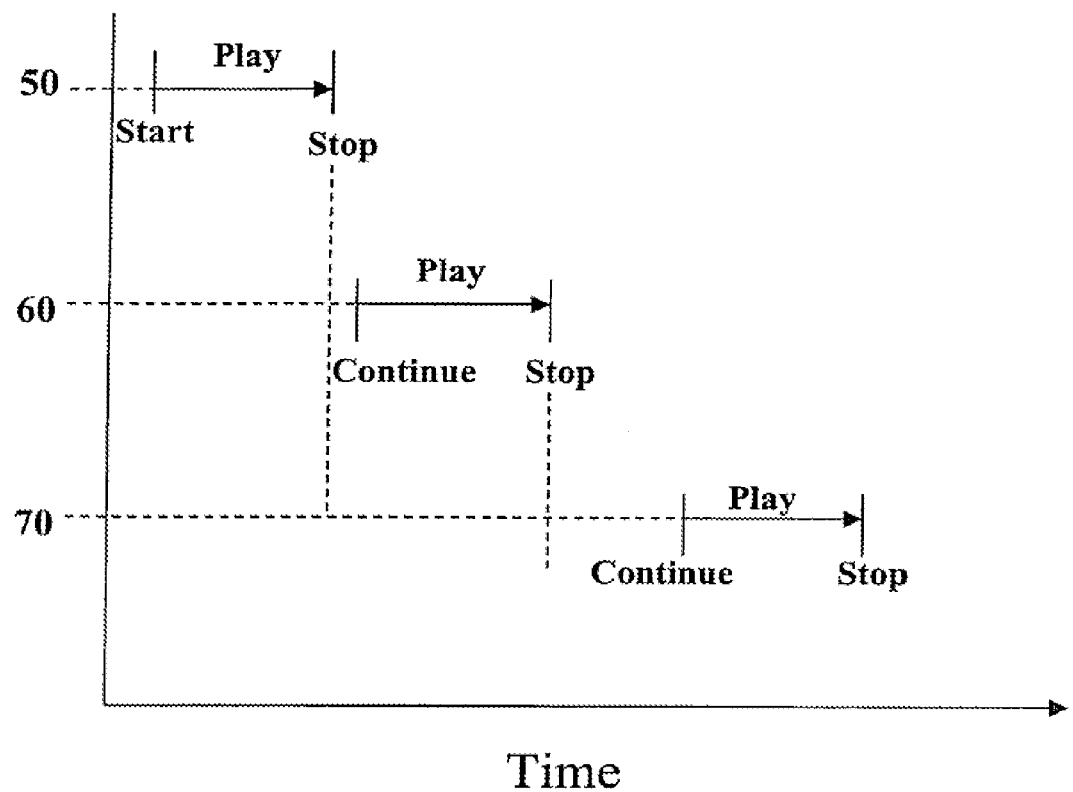
FIG. 4 is a timing chart showing the operation of one embodiment of the present invention.

In FIG. 4, the "handoff" among the appliances 50, 60 and 70 is set forth in one embodiment. In FIG. 4, appliance 50 in time plays the message in response to a START command and stops the messages in response to a STOP command. The user enters the bath area 30 and states CONTINUE and the computer hub 80 detects the audible CONTINUE command coming from appliance 60. This identifies appliance 60 as the new appliance to which messages are to be delivered. This occurs because the microphone 292 in appliance 60 senses the command CONTINUE, delivers it to its computer 210 which in turn delivers the command through wireless module 280 to the computer hub 80. The computer hub 80 then continues to play the messages in appliance 60. In addition, when the user issues a STOP command, appliance 60 stops and the computer 80 senses the STOP command and ceases the play of the messages in appliance 60. When the user enters the shower 32 and the user states PLAY, the appliance 70, through its microphone 292 and its computer 210, delivers a CONTINUE command through wireless module 280 to computer hub 80 and the messages are resumed for play in the shower. The user, of course, under the teachings of the present invention, can select which appliance in which order in which to communicate with the hub computer 80.

It is to be expressly understood that appliances 50, 60 and 70 can occur throughout the building 10. Hence, suitable appliances can be found in the kitchen, garage, etc. In yet another embodiment, many of the control components in FIG. 2 are performed in computer 82 so that each Internet appliance 50, 60 and 70 are less "smart."

5. Pre-Programming Hub Computer

Figure 5:
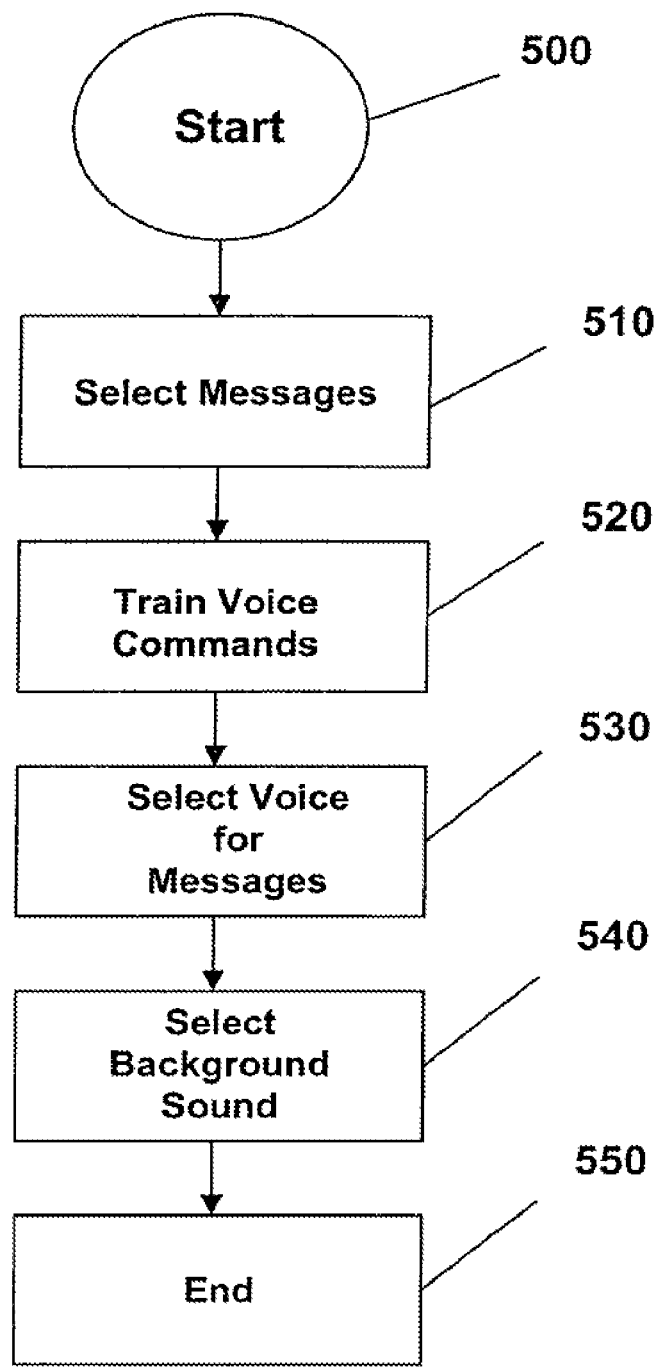
FIG. 5 is a flow chart showing programming the computer hub of the present invention.

In FIG. 5, the preferred programming of the hub 80 occurs with the user logging into the computer 82 and starting the programming process. A suitable screen is presented on the monitor 84 and the steps 510, 520, 530, 540 can occur in any fashion desired by the user simply by clicking on the suitable icon. In stage 510, the user selects which messages are to be played upon wake-up. In the preferred embodiment where the system responds to a voice command, the messages can be grouped so that they are played in response to a voice command such as "e-mail," "stock," "appointments," etc. For example, in stage 510, the user may select appointments and stock quotes and, then in stage 520 train the hub 80 to recognize the voice command for appointments and stock. For example, the voice command for appointments could be simply the word "today" or the word "appointments" or any other suitable vocal command. Assume, for example, the command chosen is "today" for appointment messages and the command "rich" is the audible command for the stock messages. It is well known how to train a voice recognition program to recognize vocal commands especially simple vocal commands that have distinct vocal patterns. Hence, in this example, the command "today" will be associated with the group of appointments for that day and the computer hub 80 can assemble those appointments from any suitable source such as a laptop, palm computer, Internet connection to the remote office computer, etc. With respect to the vocal command "rich" the user must enter stock symbols so that the hub computer 80 can retrieve the present stock values of the stock symbols chosen which are also conventionally available from a number of different sources.

One area critical to the user can be a top priority list grouping where messages from different groups are collected together. These are messages of great importance to the user and are tagged as such. An example of such top priority messages could be: "my 10.sup.th anniversary," "call Peggy tonight at 8:00 p.m.," etc. And, the command could be "Top Priority."

In another example, the user may only wish to hear e-mail and appointments and, in stage 510, selects those messages. The voice commands in this example are "appointments" and "e-mail." In stage 520, the computer is trained to recognize these commands so it is to be understood that in some embodiments, the training can occur at the actual appliance 50, 60 and 70 wherein the user speaks into the microphone 292. Returning to the example, the user may also voice train the hub computer 80 in stage 520 to recognize the command "skip" (or any suitable voice command) so that if an e-mail message is too long, the user can command "skip" and the next e-mail is read. Additional voice commands can be used to increase the volume for the voice for the messages by stating "louder" or "softer." Or, the user can train the command "stop" and no more e-mail would be read. A wide variety of messages and voice commands can be selected in stage 510 and trained in stage 520.

Figure 6:
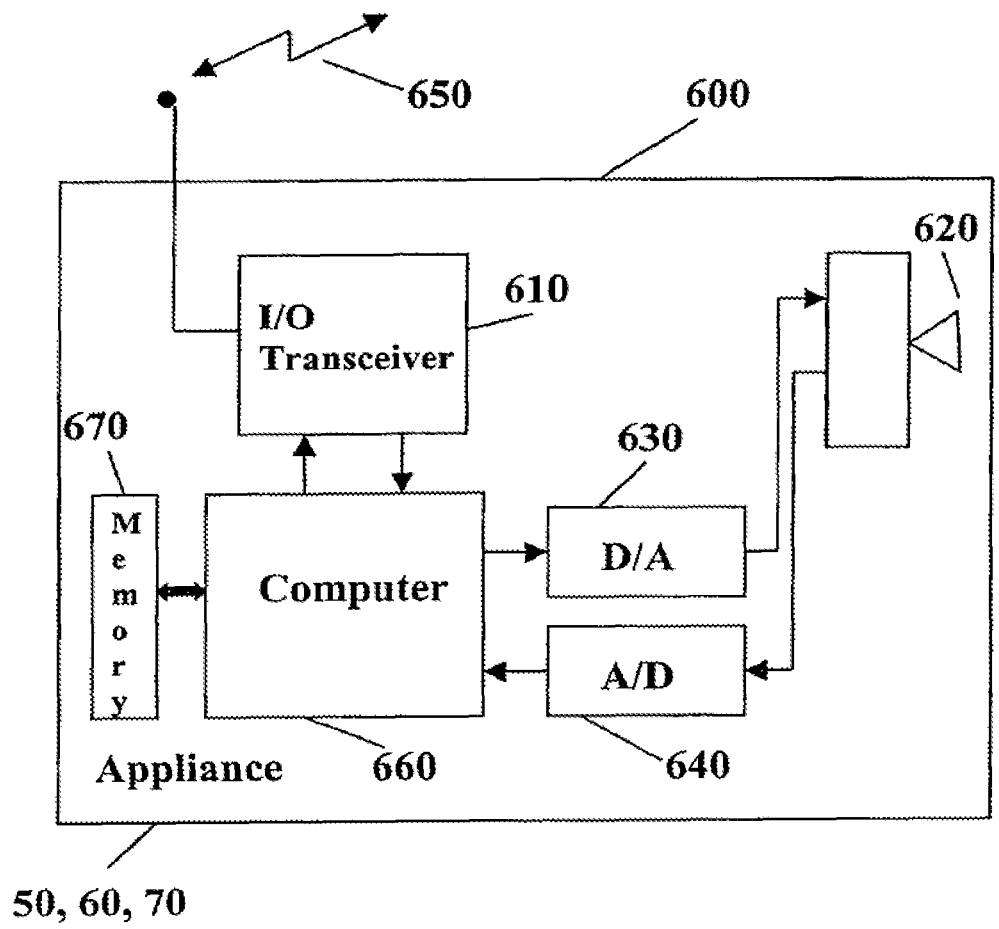
FIG. 6 is a block diagram of a second embodiment of the individual appliance of the present invention.

An optional stage 530 is provided wherein the user can select from a variety of voices for reading the messages. For example a soft female's voice, a robotic sounding voice, a masculine sounding deep voice, etc. All can be selected and changed at any time. In addition, in optional stage 540, a background sound can also be selected. This background sound can be music (or other sounds) preprogrammed at the hub 80 or it can be actual voice or sound from the appliance 50, 60, or 70. Indeed, the hub computer 80 can be programmed such as in stage 540 to select an Internet radio station to provide the sound to the appliances 50, 60, and 70 as well as the wake-up alarm (if required), etc. The retrieval and conversion of the messages can occur in the hub 80 so that it is delivered into the radio speaker directly. This would simplify the construction of appliances 50, 60, and 70 and utilize the Internet radio selection and clock in the hub 80. For example, each appliance could simply be a speaker/microphone (230, 292) and an I/O driver transceiver (280, 290) with the hub 80 performing all the remaining functions (i.e., wake-up time, wake-up sound, radio selection, etc.) When the user is done programming the hub computer 80, the user exits in stage 550. Such a second embodiment 600 is shown in FIG. 6. The appliance 600 has the I/O transceiver 610 is in wireless 650 communication with the hub computer 80. The transceiver 610 is connected to computer 660 and memory 670. The computer controls the microphone/speaker 620 through digital/audio converter 630 and receives commands over audio/digital converter 640.1.

It is to be expressly understood that a wide variety of pre-programming can be done by a user under the teachings of the present invention and that the scope of the invention is not limited by the examples and variations set forth above.

6. Summary of Method

A method is provided for receiving messages in an appliance such as a clock radio modified under the teachings of the present invention to retrieve messages from a hub computer, converting the retrieved messages into corresponding audio messages, generating a wake up signal to the user at a selected time in the radio appliance, starting the delivery of the audio messages from a speaker in the radio appliance in response to the generated wake up signal, and receiving audible commands in the radio from the user to control delivery of the messages. In a first embodiment, these method steps are performed in the radio appliance and, in a second embodiment, a remote computer performs all of the messages except delivery of the audio messages and receiving audio commands which occur at the appliance. Where two or more appliances are used, audio commands can cause the delivery of messages to stop in one appliance and resume in another appliance.

In one variation of the method of the present invention, the user selects groups of messages in the hub computer in order to tailor the grouping of messages to the individual's desired needs. The hub computer then obtains each group of messages from a message source whether the message source resides in the hub computer, accessing a remote office computer over the Internet or other communication network, accessing message sources on the Internet or other communication links. The message group can be appointments, stock information, retrieved messages, top priority messages selected from among the various groups, or any desired grouping of messages and prioritization. The method of the present invention in another variation includes the option of delivering the background audio sound in each appliance while the message is being delivered. In another variation, the audible commands can include stopping, skipping, repeating, or continuing a message or a group of messages.

In another embodiment of the present invention, the method shifts deliveries of the groups of messages or messages based upon audible commands by the user from one appliance to another appliance. When a first appliance is delivering messages to the user, the receipt of an audible command to stop delivery is sensed and delivered to the hub computer which stops delivery. When the user issues a second audible command to the second appliance, the second appliance senses this and delivers it to the hub computer which identifies the second appliance to resume delivery of the messages.

It is to be expressly understood that under the method of the presented herein, that the use of certain terminology such as "hub computer" is not intended to limit the invention to a particular type of computer. The term "hub" could be remote, central, home, etc. In the embodiment shown in FIG. 1, it is typically a home computer located in a physical house in communication proximity to the appliances 50, 60, and 70.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

What is claimed:

1. A method, comprising:
  playing a signal representative of data at a first appliance, the first appliance located in a first location of a household;
  pausing the playing of the signal at the first appliance;
  transmitting, to a second appliance, an indication of the point at which the playing was paused; and
  resuming the playing of the signal at the second appliance, the second appliance located in a second location of the household.

2. The method of claim 1, wherein the data comprises audio data.

3. The method of claim 2, further comprising:
  receiving, at the first appliance, a user indication of the audio data.

4. The method of claim 1, wherein the playing is responsive to receiving a start command at the first appliance, wherein the pausing is responsive to receiving a stop command at the first appliance, and wherein the resuming is responsive to receiving a resume command at the second appliance.

5. The method of claim 4, wherein at least one command, from the group consisting of the start command, the stop command, and the resume command, is an audible command.

6. The method of claim 1, wherein transmitting the indication comprises transmitting, from the first appliance to the second appliance, the indication of the point at which the data was paused.

7. The method of claim 6, wherein the indication of the point at which the data was paused is transmitted via a communication link, and wherein the communication link comprises at least one from the group consisting of a wireless communication link and a wired communication link.

8. A system, comprising:
  a first appliance located in a first location of a household, wherein the first appliance is configured to play a signal representative of data, and wherein the first appliance is further configured to pause the playing of the signal; and
  a second appliance located in a second location of the household and in communication with the first appliance, wherein the second appliance is configured to receive an indication of the point at which the playing was paused and resume the playing of the signal.

9. The system of claim 8, wherein the data comprises audio data.

10. The system of claim 9, wherein the first appliance is configured to receive a user indication of the audio data.

11. The system of claim 8, wherein first appliance is configured to play the signal in response to receiving a start command and to pause the playing of the signal in response to receiving a stop command, and wherein the second appliance is configured to resume the playing of the signal in response to receiving a resume command.

12. The system of claim 8, wherein at least one of the first appliance and the second appliance is configured to receive audible commands.

13. The system of claim 10, further comprising:
  a communication link configured to transmit, from the first appliance to the second appliance, the indication of the point at which the playing was paused, wherein the communication link comprises at least one from the group consisting of a wireless communication link and a wired communication link.

14. A non-transitory computer readable medium comprising instructions executable by a computing device, the instructions comprising:
  instructions to play a signal representative of data at a first appliance, the first appliance located in a first location of a household;
  instructions to pause the playing of the signal at the first appliance;
  instructions to transmit, to a second appliance, an indication of the point at which the playing was paused; and
  instructions to resume the playing of the signal at the second appliance, the second appliance located in a second location of the household.

15. The computer readable medium of claim 14, wherein the data comprises audio data.

16. The computer readable medium of claim 15, the instructions further comprising:
  instructions to receive, at the first appliance, a user indication of the audio data.

17. The computer readable medium of claim 14, wherein the instructions to play comprise instructions to play the signal in response to receiving a start command at the first appliance, wherein the instructions to pause comprise instructions to pause the playing of the signal in response to receiving a stop command at the first appliance, and wherein the instructions to resume comprise instructions to resume the playing of the signal in response to receiving a resume command at the second appliance.

18. The computer readable medium of claim 17, wherein at least one command, from the group consisting of the start command, the stop command, and the resume command, is an audible command.

19. The computer readable medium of claim 14, wherein the instructions to transmit comprise instructions to transmit, from the first appliance to the second appliance, an indication of the point at which the playing was paused.

20. An appliance, comprising:
  a user input mechanism configured to receive a continue command; and
  an output mechanism configured to play a signal representative of data;
  wherein the appliance is configured to receive an indication that a portion of the data has been played at a second appliance and that the playing of the data has been paused at the second appliance;
  wherein the appliance is further configured to play a signal via the output mechanism in response to receiving a continue command via the user input mechanism, the signal representative of the point at which the playing of the data had been paused at the second appliance.

21. The appliance of claim 20, wherein the data comprises audio data.

22. The appliance of claim 21, wherein the output mechanism is a speaker.

23. The appliance of claim 21, further comprising:
  a memory configured to store the data.

24. The appliance of claim 20, further comprising:
a communication module configured to communicate with the second appliance via a communication link, wherein the communication link comprises at least one from the group consisting of a wireless communication link and a wired communication link.

25. The appliance of claim 20, wherein the user input mechanism comprises a microphone and a voice recognition module.

26. The appliance of claim 20, wherein the user input mechanism comprises at least one button.

* * * * *